(12) United States Patent
Tatsuno et al.

(10) Patent No.: US 7,273,124 B2
(45) Date of Patent: Sep. 25, 2007

(54) PRIME MOVER CONTROL DEVICE OF CONSTRUCTION MACHINE

(75) Inventors: Yukihiro Tatsuno, Tsukuba (JP); Hidetoshi Satake, Ishioka (JP); Kazuhiro Ichimura, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 388 days.

(21) Appl. No.: 10/528,067

(22) PCT Filed: Sep. 26, 2002

(86) PCT No.: PCT/JP02/09966

§ 371 (c)(1),
(2), (4) Date: Mar. 15, 2005

(87) PCT Pub. No.: WO2004/029435

PCT Pub. Date: Apr. 8, 2004

(65) Prior Publication Data

US 2006/0096799 A1 May 11, 2006

(51) Int. Cl.
*B60K 26/00* (2006.01)
(52) U.S. Cl. .......................... 180/305; 701/110; 701/93
(58) Field of Classification Search ................ 180/305, 180/65.1, 65.2, 307, 308; 701/93, 110
See application file for complete search history.

(56) References Cited

U.S. PATENT DOCUMENTS

| 4,240,515 | A | * | 12/1980 | Kirkwood | 180/165 |
| 4,554,992 | A | * | 11/1985 | Kassai | 180/307 |
| 5,277,269 | A | | 1/1994 | Ichimura et al. | |
| 5,709,282 | A | * | 1/1998 | Akira et al. | 180/307 |
| 5,754,428 | A | | 5/1998 | Ishikawa | |
| 6,349,253 | B1 | * | 2/2002 | Bellinger | 701/53 |
| 7,031,822 | B1 | * | 4/2006 | Hashimoto et al. | 701/103 |

FOREIGN PATENT DOCUMENTS

| EP | 0 424 088 A2 | 6/1991 |
| EP | 0 761 491 A2 | 3/1997 |
| EP | 1 006 298 A2 | 6/2000 |
| JP | A 02-018115 | 1/1990 |
| JP | A 03-135844 | 6/1991 |
| JP | B2 2634330 | 4/1997 |
| JP | A 2001-295682 | 10/2001 |

* cited by examiner

*Primary Examiner*—Christopher P. Ellis
*Assistant Examiner*—Cynthia F. Collado
(74) *Attorney, Agent, or Firm*—Oliff & Berridge, PLC

(57) ABSTRACT

A prime mover control device of a construction machine according to the present invention includes a hydraulic pump (11) driven by a prime mover (40), a hydraulic traveling motor (5) driven with pressure oil output from the hydraulic pump (11), and a control valve (12) that controls a flow of the pressure oil from the hydraulic pump (11) to the hydraulic motor (5) in response to an operation of an operating member (22a). The prime mover control device further includes a deceleration detection means (31) that detects a deceleration operation at the operating member (22a), a rotation speed detection means (35) that detects a rotation speed Nm of the hydraulic motor (5), and a prime mover rotation speed control means (30,43) that executes speed reduction control of the rotation speed of the prime mover (40) based upon detection results provided by the rotation speed detection means (35) if the deceleration operation is detected by the deceleration detection means (31) and controls the rotation speed of the prime mover (40) in correspondence to an operation of the operating member (22a) which is detected to be other than the deceleration operation.

5 Claims, 10 Drawing Sheets

PRIME MOVER CONTROL DEVICE OF CONSTRUCTION MACHINE

TECHNICAL FIELD

The present invention relates to a prime mover control device of a construction machine which executes control for slowing down the rotation speed of a prime mover.

BACKGROUND ART

Control devices of this type known in the related art include the one disclosed in Japanese Patent No. 2634330.

The controller disclosed in this publication gradually lowers the engine rotation speed instead of immediately lowering it to the idling rotation speed after a travel pedal in a traveling vehicle is released. Namely, it executes speed control on the engine rotation speed so as to prevent the occurrence of cavitation.

Under circumstances in which cavitation tends to occur more readily, such as when the vehicle travels down a long slope, the occurrence of cavitation may not be prevented reliably simply by slowing down the engine rotation speed in response to the release of the travel pedal.

DISCLOSURE OF THE INVENTION

An object of the present invention is to provide a prime mover control device of a construction machine which reliably prevents cavitation even while the construction machine travels down a long slope.

The present invention is adopted in a construction machine having a hydraulic pump driven with a prime mover, a hydraulic motor for traveling driven with pressure oil output from the hydraulic pump and a control valve that controls the flow of the pressure oil from the hydraulic pump to the hydraulic motor in response to an operation of an operating member. The prime mover control device comprises a deceleration detection means for detecting a deceleration operation at the operating member, a rotation speed detection means for detecting the rotation speed of the hydraulic motor and a prime mover rotation speed control means for executing speed control of the rotation speed of the prime mover based upon the results of the detection executed by the rotation speed detection means if the deceleration detection means detects the deceleration operation and for controlling the rotation speed of the prime mover in response to an operation of the operating member if an operation other than a deceleration operation is detected.

Since this structure assures a sufficient level of make-up pressure even while the construction machine travels down a long slope, pressure oil is supplied at a sufficiently high make-up flow rate to prevent cavitation.

It is preferable to sustain the prime mover rotation speed at a constant level when the motor rotation speed is greater than a predetermined value and to gradually reduce the prime mover rotation speed if the motor rotation speed is equal to or less than the predetermined value.

In addition, the prime mover rotation speed may be gradually reduced over a predetermined length of time or by a predetermined extent during a deceleration operation, and subsequently, the prime mover rotation speed may be sustained at a constant level if the motor rotation speed is greater than a predetermined value but the prime mover rotation speed may be gradually reduced if the motor rotation speed is equal to or less than the predetermined value.

The present invention is ideal in an application in a wheeled hydraulic excavator.

BEST MODE FOR CARRYING OUT THE INVENTION

First Embodiment

The first embodiment achieved by adopting a prime mover control device according to the present invention in a wheeled hydraulic excavator is explained in reference to FIGS. 1 through 8.

Figure 1:
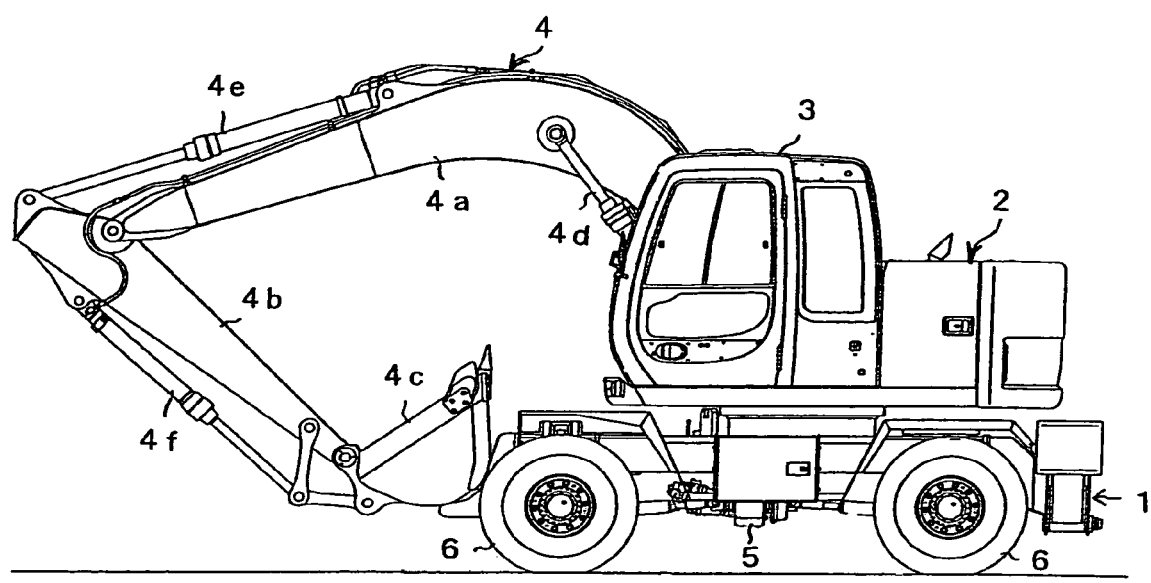
FIG. 1 is an external view of a wheeled hydraulic excavator in which the present invention is adopted.

As shown in FIG. 1, the wheeled hydraulic excavator includes an undercarriage 1 and a revolving superstructure 2 rotatably mounted atop the undercarriage 1. An operator's cab 3 and a work front attachment 4 constituted with a boom 4a, an arm 4b and a bucket 4c are provided at the revolving superstructure 2. The boom 4a is raised/lowered as a boom cylinder 4d is driven, the arm 4b is raised/lowered as an arm cylinder 4e is driven and the bucket 4c is engaged in a dig/dump operation as a bucket cylinder 4f is driven. A traveling motor 5, which is hydraulically driven, is provided at the undercarriage 1, and the rotation of the traveling motor 5 is transmitted to wheels 6 (tires) via a drive shaft and an axle.

Figure 2:
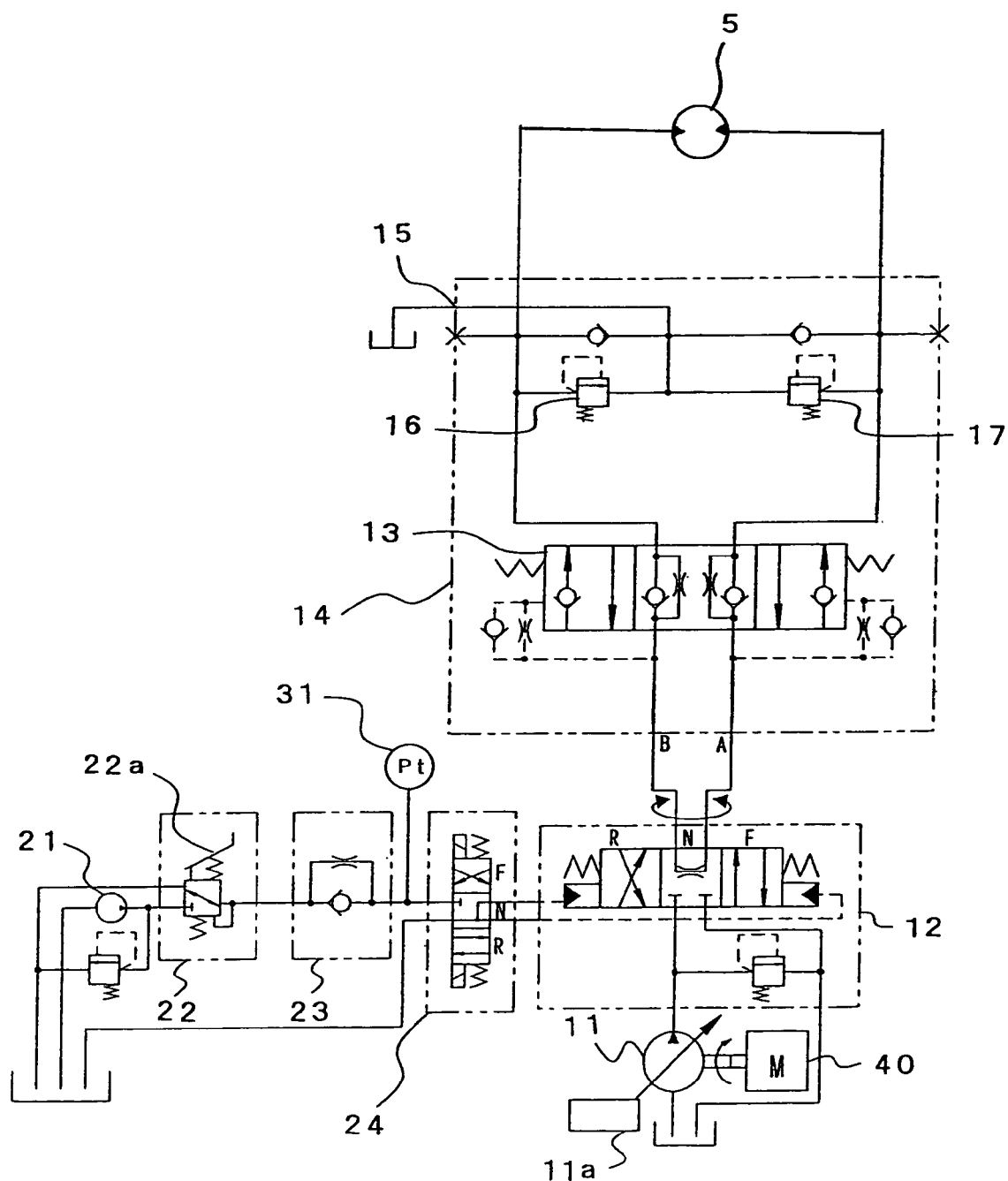
FIG. 2 is a circuit diagram of a hydraulic circuit for traveling in the wheeled hydraulic excavator in FIG. 1.

FIG. 2 is a circuit diagram of a traveling hydraulic circuit in the wheeled hydraulic excavator shown in FIG. 1. As shown in FIG. 2, oil output from a variable-displacement main pump 11 driven by an engine (prime mover) 40, with its direction and flow rate controlled through a control valve 12, is supplied to the traveling motor 5 via a brake valve 14 which includes a built-in counter-balance valve 13. The degree of swash angle or displacement amount of the main pump 11 is adjusted by a pump regulator 11a.

A pilot circuit includes a pilot pump 21, a pilot valve 22 that generates a secondary pilot pressure in response to an operation of a travel pedal 22a, a slow return valve 23 connected to the pilot valve 22, which delays the return of the oil to the pilot valve 22, and a forward/backward switching valve 24 that is switched to a forward setting (F position), a backward setting (R position) or a neutral setting (N position) in response to an operation of a forward/backward selector switch (not shown). A pressure sensor 31 is connected between the slow return valve 23 and the forward/backward switching valve 24, and a pressure Pt corresponding to the extent to which the travel pedal 22a is operated is detected with the pressure sensor 31.

As the forward/backward switching valve 24 is set to the F position or the R position through a switch operation and then the travel pedal 22a is operated, a pilot pressure originating from the pilot pump 21 is applied to the control valve 12. In response, the control valve 12 is switched, the pressure oil from the main pump 11 is applied to the traveling motor 5 via the control valve 12 and the traveling motor 5 rotates at a speed corresponding to the extent to which the pedal has been operated, thereby causing the vehicle to travel.

As the accelerator pedal 22a is released while the vehicle is traveling, the pilot valve 22 cuts off the pressure oil from the pilot pump 21, and its outlet port comes into communication with a reservoir. As a result, the pressure oil which has been applied to the pilot port of the control valve 12 is caused to return to the reservoir via the forward/backward switching valve 24, the slow return valve 23 and the pilot valve 22. At this time, the returning oil is restricted through a restrictor at the slow return valve 23 and thus, the control valve 12 is gradually switched to the neutral position. Once the control valve 12 is switched to the neutral position, the oil output from the main pump 11 is allowed to return to the reservoir and thus, the supply of pressure oil to the traveling motor 5 becomes cut off and the counter-balance valve 13, too, is switched to the neutral position as shown in the figure.

Under these circumstances, the vehicle body keeps traveling with the inertial force, and the traveling motor 5 switches from the motor operation to a pump operation during which the B port side in the figure is used for intake and the A port side in the figure is used for outlet if the vehicle is traveling forward (the intake port and the outlet port are reversed if the vehicle is traveling backward). Since the pressure oil from the traveling motor 5 is restricted through a restrictor (restrictor at the neutral position) at the counter-balance valve 13, the pressure between the counter-balance valve 13 and the traveling motor 5 rises and is applied to the traveling motor 5 as a braking pressure. As a result, the traveling motor 5 imparts a braking torque to apply braking to the vehicle. If the quantity of oil being taken in during the pump operation becomes low, more oil is delivered from a make-up port 15 to supplement the supply to the traveling motor 5. The maximum level that the braking pressure achieves is regulated through relief valves 16 and 17.

If the travel pedal 22a is released on a downhill slope, a hydraulic brake is generated and thus, the vehicle with the brake applied thereto travels downhill under inertia, as in the deceleration operation described above. Since the level of the inertial force of the vehicle is higher under these circumstances compared to the inertial force manifesting when the travel pedal 22a is released while the vehicle is traveling on level ground, oil must be supplemented in a large enough quantity from the make-up port 15 in order to prevent cavitation. For this reason, according to the present invention the rotation speed of the engine 40 during the deceleration operation is controlled as described later so as to prevent the shortage of make-up flow rate due to insufficient make-up pressure.

Figure 3:
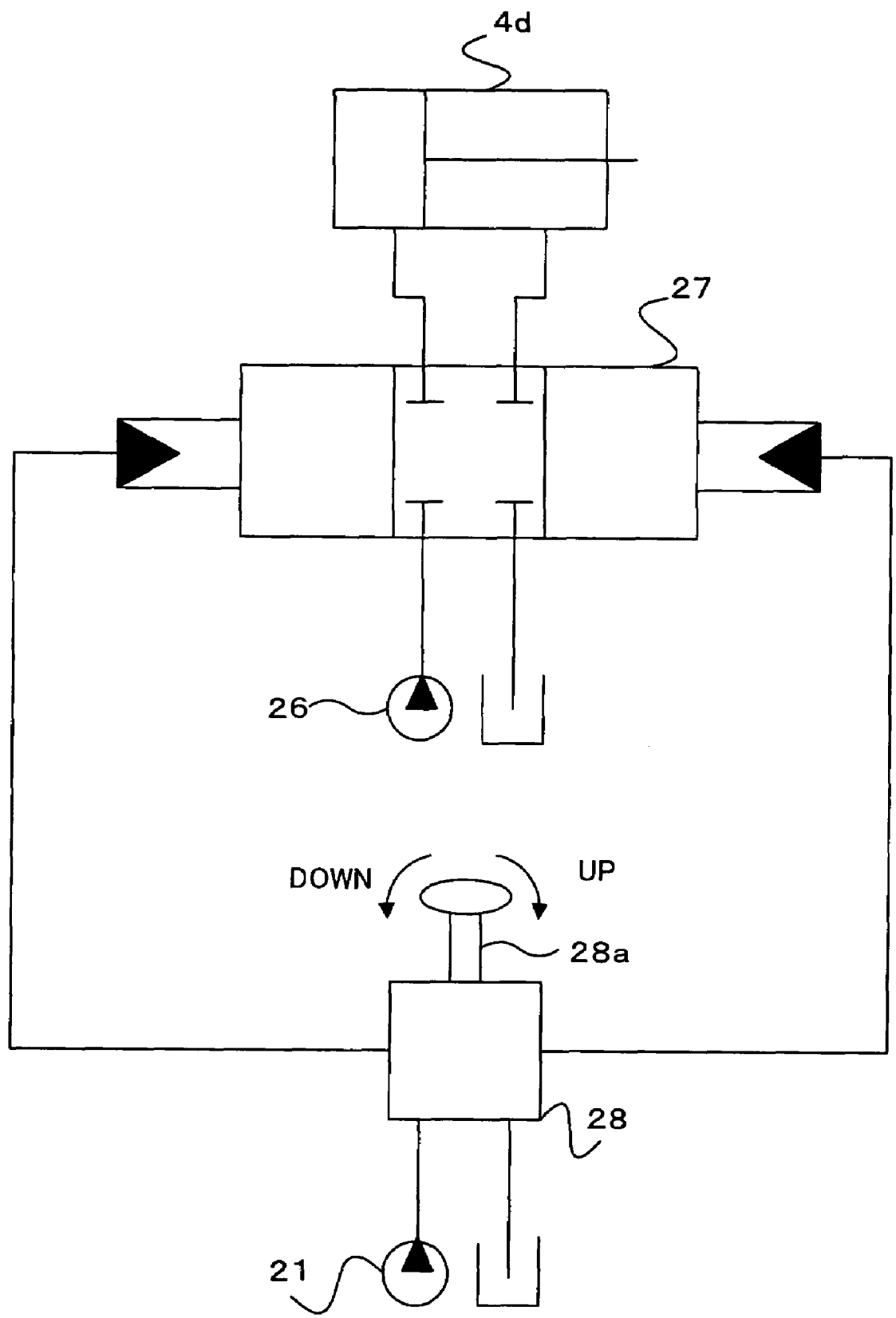
FIG. 3 is a circuit diagram of a work hydraulic circuit in the wheeled hydraulic excavator in FIG. 1.

FIG. 3 shows a hydraulic circuit of the boom cylinder unit, representing an example of a work hydraulic circuit. This hydraulic circuit includes a main pump 26, the boom cylinder 4d that is caused to extend/contract by pressure oil from the main pump 26, a control valve 27 that controls the flow of the pressure oil from the main pump 26 to the boom cylinder 4d, the pilot pump 21 and a pilot valve 28 driven via an operating lever 28a. It is to be noted that although not shown, hydraulic circuits of the other work actuators are similar to that shown in FIG. 3.

In response to an operation of the operating lever 28a, the pilot valve 28 is driven in correspondence to the extent to which the operating lever 28a has been operated and a pilot pressure achieve by lowering the pressure from the pilot pump 21 is applied to the control valve 27. As a result, the pressure oil from the main pump 26 is guided to the boom cylinder 4d via the control valve 27 and, as the boom cylinder 4d extends/contracts, the boom 4a is raised/lowered. It is to be noted that the hydraulic circuit may dispense with the main pump 26 and, in such a case, the cylinder 4d can be driven with the pressure oil from the main pump 11.

Figure 4:
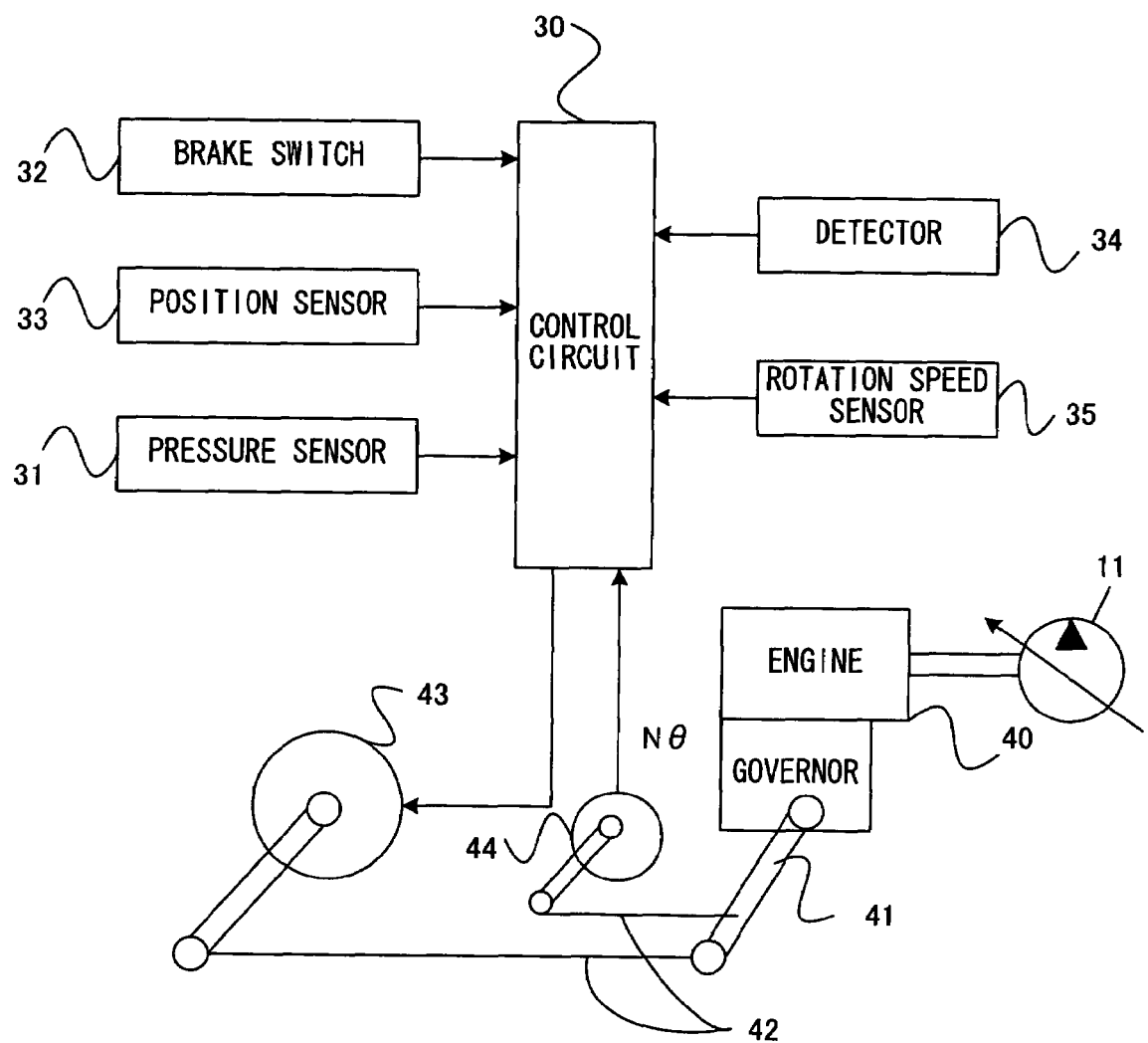
FIG. 4 is a block diagram of a prime mover control device achieved in an embodiment of the present invention.

FIG. 4 is a block diagram of a control circuit that controls the rotation speed of the engine 40. A governor lever 41 of the engine 40 is connected to a pulse motor 43 via a link mechanism 42 and the engine rotation speed is adjusted with the rotation of the pulse motor 43. Namely, the engine rotation speed increases as the pulse motor 43 rotates forward, and the engine rotation speed decreases with a reverse rotation of the pulse motor 43. A potentiometer 44 is connected to the governor lever 41 via the link mechanism 42, and the governor lever angle corresponding to the rotation speed of the engine 40, which is detected with the potentiometer 44, is input to the control circuit 30 as an engine control rotation speed Nθ.

The control circuit 30 is connected with the pressure sensor 31 that detects the pilot pressure Pt corresponding to the extent to which the travel pedal 22a is operated, a brake switch 32, position sensor 33 that detects the position to which the forward/backward switching valve 24 is switched, a detector 34 that detects the extent X to which an operating member (e.g., a fuel lever) for issuing a rotation speed command (not shown) is operated and a rotation speed sensor 35 that detects the rotation speed of the traveling motor 5.

As the brake switch 32 is switched to a traveling position, a work position or a parking position, a work or traveling signal is output from the brake switch 32. When the brake switch 32 is switched to the traveling position, a parking brake is canceled and the operation of a service brake is enabled through a brake pedal. As the brake switch 32 is switched to the work position, the parking brake and the service brake are both engaged. When it is switched to the parking position, the parking brake is engaged. As the brake switch 32 is switched to the traveling position, it outputs an off signal, whereas it outputs an on signal when it is switched to the work or parking position.

The rotation speed control circuit 30 executes the following arithmetic operation and outputs a control signal to the pulse motor 43.

Figure 5:
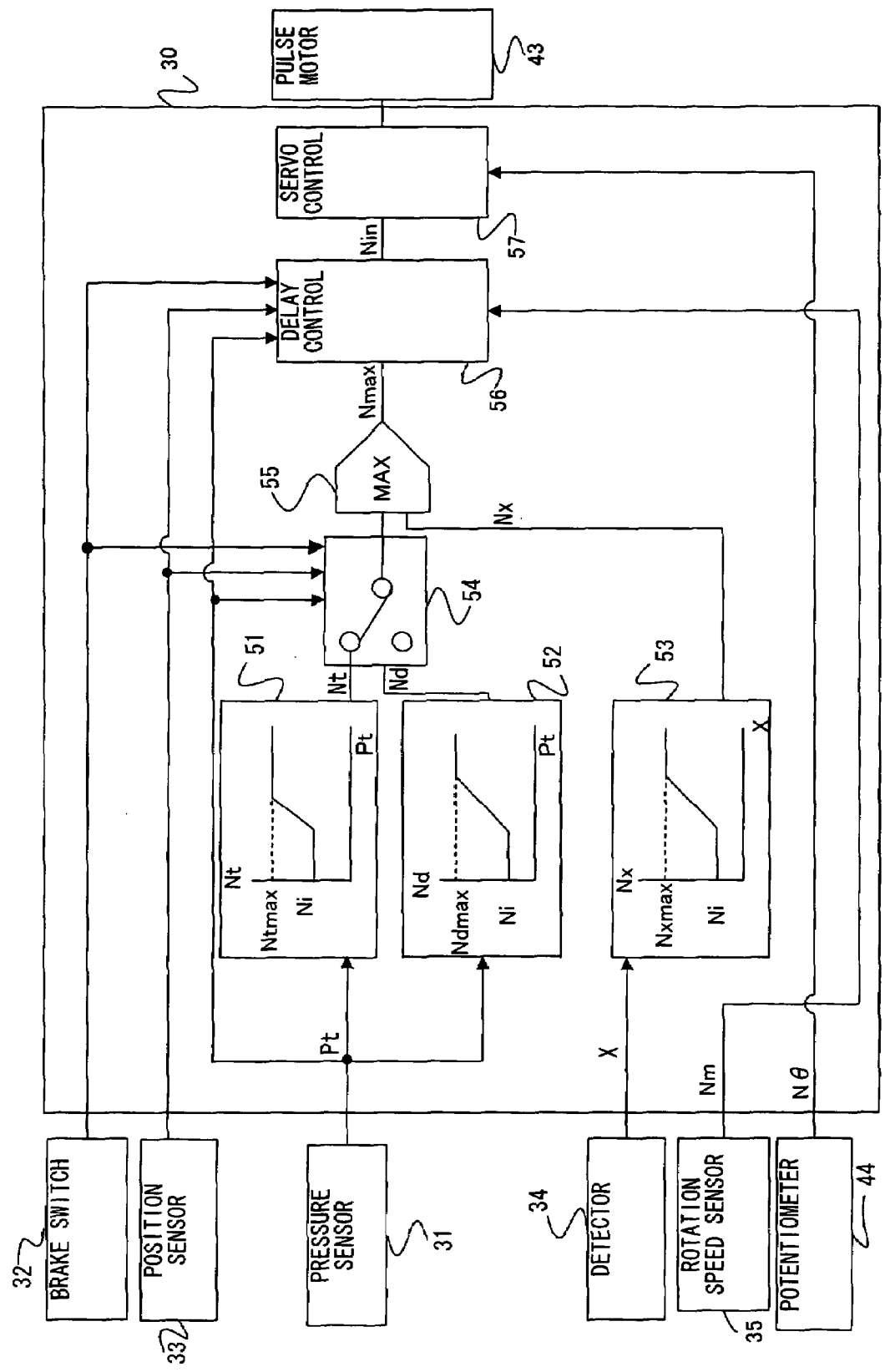
FIG. 5 shows in detail a control circuit in FIG. 4.

FIG. 5 is a conceptual diagram illustrating in detail the rotation speed control circuit 30. The relationships between the detection value Pt provided by the pressure sensor 31 and a target rotation speed Nt and between the detection value Pt and a target rotation speed Nd are stored in memory in advance at rotation speed calculation units 51 and 52 respectively as shown in the figure, and the target rotation speeds Nt and Nd matching the extent to which the travel pedal 22a is operated are individually calculated based upon the characteristics of these relationships. It is to be noted that the characteristics stored in memory at the rotation speed calculation unit 51 are the characteristics suited for traveling, whereas the characteristics stored in memory at the rotation speed calculation unit 52 are the characteristics suited for work performed by using the work attachment 4. These characteristics indicate linear increases in the target rotation speeds Nt and Nd from the idling rotation speed Ni as the extent of pedal operation increases. The target rotation speed Nt increases in a steeper slope compared to the target rotation speed Nd, and a maximum value Ntmax of the target rotation speed Nt is greater than a maximum value Ndmax of the target rotation speed Nd.

As shown in the figure, the relationship between the detection value X provided by the detector 34 and a target rotation speed (rotation speed setting) Nx is stored in memory in advance at a rotation speed calculation unit 53 as shown in the figure, and the target rotation speed Nx corresponding to the extent to which the fuel lever is operated is calculated based upon the characteristics of the relationship. It is to be noted that a maximum value Nxmax of the target rotation speed Nx is set equal to the maximum value Ndmax at the rotation speed calculation unit 52.

A selection unit 54 selects one of the target rotation speeds Nt and Nd provided by the rotation speed calculation units 51 and 52, based upon the signals provided from the brake switch 32, the position sensor 33 and the pressure sensor 31. If the brake switch 32 has been switched to the traveling position (an off signal is output), the forward/backward switching valve 24 is set at a position other than the neutral position and the pilot pressure Pt representing the extent of the operation of the travel pedal 22a is greater than a predetermined value (e.g., 0), i.e., if the vehicle is traveling, the target rotation speed Nt is selected, and the target rotation speed Nd is selected otherwise, i.e., under non-traveling conditions. A maximum value selection unit 55 compares the target rotation speed Nt or Nd selected by the selection unit 54 with the target rotation speed Nx calculated at the rotation speed calculation unit 53 and selects the larger value as Nmax.

Figure 6:
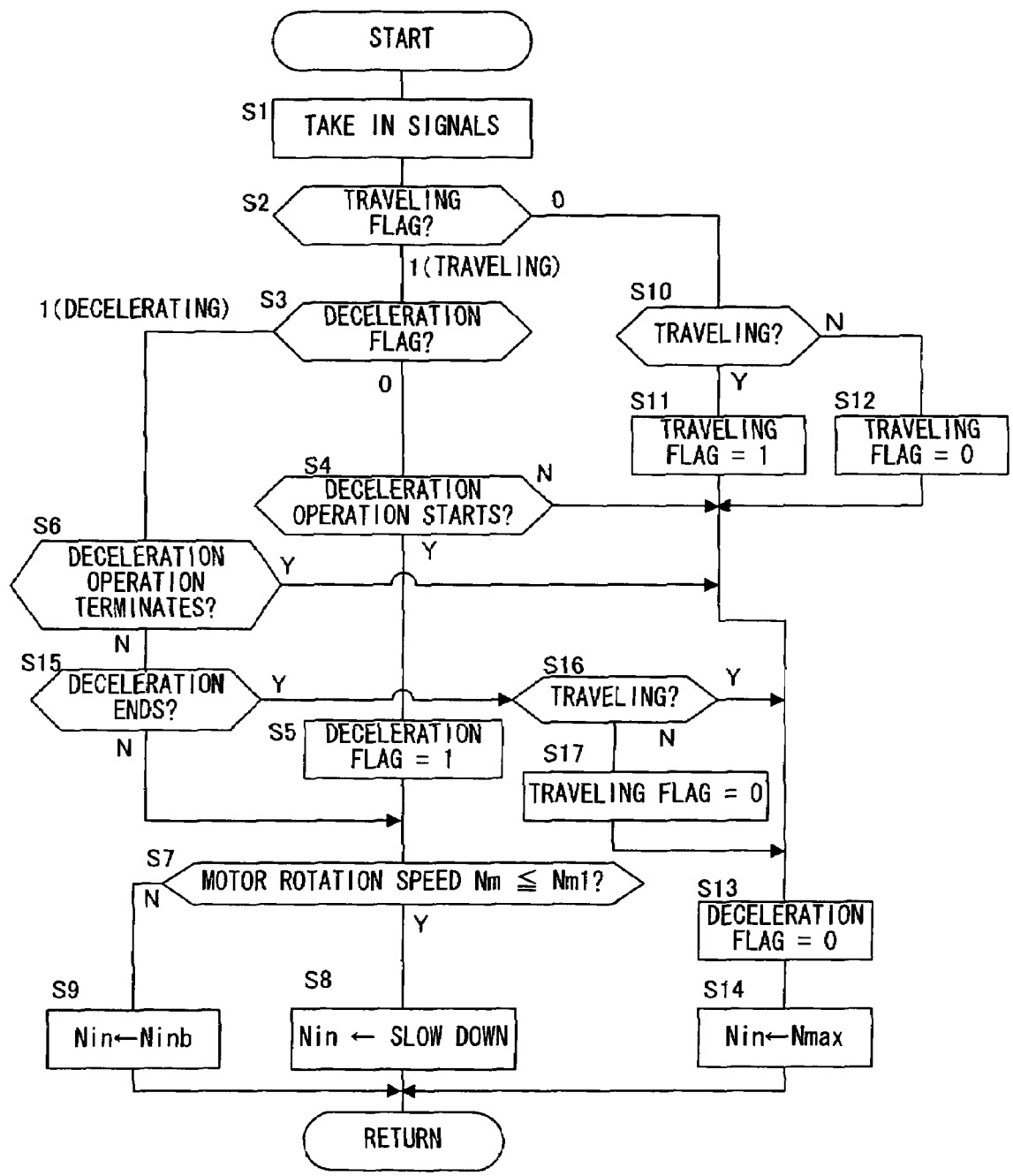
FIG. 6 presents a flowchart of the control procedure in a delay control unit achieved in the first embodiment shown in FIG. 4.
Figure 7:
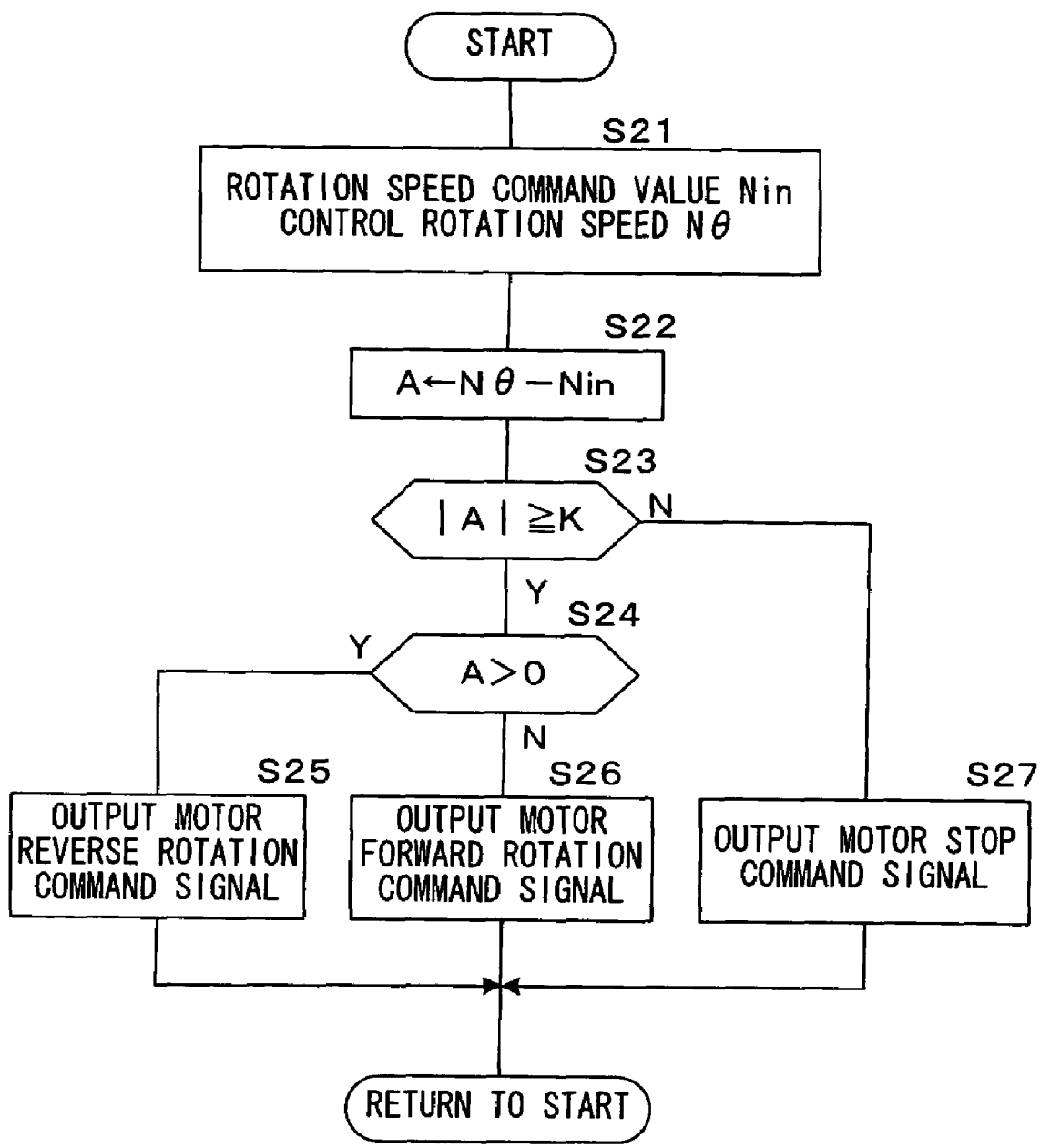
FIG. 7 presents a flowchart of the control procedure in a servo control unit in FIG. 4.

A delay control unit 56 calculates a rotation speed command value Nin through the procedure shown in FIG. 6 based upon the selected rotation speed Nmax and the signals provided from the brake switch 32, the position sensor 33, the pressure sensor 31 and the rotation speed sensor 35.

A servo control unit 57 compares the rotation speed command value Nin calculated at the delay control unit 56 with the control rotation speed Nθ corresponding to the displacement quantity of the governor lever 41 detected with the potentiometer 44. Then, it controls the pulse motor 43 through the procedure shown in FIG. 7 so as to match the two values.

The processing executed at the delay control unit 56 is now explained. In step S1 in FIG. 6, the value selected at the maximum value selection unit 55 and the signals from the sensors 31, 33 and 35 and from the switch 32 are read. Next, a decision is made with regard to the value indicated by a traveling flag in step S2. Through processing to be detailed later (executed in steps S10, S11 and S12), the traveling flag is set to 1 if the vehicle is traveling and is set to 0 if the vehicle is not traveling. If it is decided in step S2 that the traveling flag is set to 1 (traveling), the operation proceeds to step S3 to make a decision with regard to the value indicated by a deceleration flag. Through processing described later, (executed in steps S4, S5 and S13), the deceleration flag is set to 1 during a deceleration but is set to 0 otherwise.

If it is decided that the deceleration flag is set to 0 (deceleration is not in progress), the operation proceeds to step S4 to make a decision as to whether or not a deceleration operation is to start by checking the signal provided from the pressure sensor 31. If the extent to which the travel pedal 22a is depressed has become reduced and the pressure detection value Pt has become equal to or less than a predetermined value Pt1, it is judged that a deceleration operation is to start. If an affirmative decision is made in step S4, the operation proceeds to step S5, whereas the operation proceeds to step S13 if a negative decision is made in step S4. In step S5, the deceleration flag is set to 1, and the deceleration flag is set to 0 in step S13.

In step S7, a decision is made as to whether or not the motor rotation speed Nm detected with the rotation speed sensor 35 is equal to or less than a predetermined value Nm1 set in advance. This processing is executed to judge whether or not the engine rotation speed is to be allowed to slow down and the predetermined value Nm1 is set by taking into consideration the level of the make-up pressure required for downhill traveling. Namely, the predetermined value Nm1 becomes larger as the extent of the decrease in the make-up pressure due to the speed reduction becomes greater. If an affirmative decision is made in step S7, the operation proceeds to step S8 to gradually decrease the rotation speed command value Nin at a predetermined rate until it becomes equal to the target rotation speed Nt, which is calculated based upon the extent of the operation of the travel pedal 22a (the pressure detection value Pt). In other words, the rotation speed command value Nin is slowed down or gradually decreased. It is to be noted that the rate at which the rotation speed command value Nin is reduced may be altered as time passes or the rate at which the rotation speed command value Nin is decreased may be altered in correspondence to the level of the rotation speed. If a negative decision is made in step S7, the operation proceeds to step S9 to substitute a previous value Ninb for the rotation speed command value Nin.

If it is decided in step S2 that the traveling flag is set to 0 (the vehicle is not traveling), the operation proceeds to step S10 to make a decision as to whether or not the vehicle is to start traveling. If the brake switch 32 has been switched to the traveling position (an off signal is output), the forward/backward switching valve 24 is set to a position other than the neutral position and the pilot pressure Pt is greater than the predetermined value, it is decided that the vehicle is to start traveling, and in this case, the operation proceeds to step S11. Otherwise, the operation proceeds to step S12. In step S11, the traveling flag is set to 1, where as the traveling flag is set to 0 in step S12. Next, the deceleration flag is set to 0 in step S13 as mentioned earlier before the operation proceeds to step S14. In step S14, the rotation speed Nmax selected at the maximum value selection unit 55 is set as the rotation speed command value Nin.

If, on the other hand, it is decided in step S3 that the deceleration flag is set to 1 (a deceleration operation is in progress), the operation proceeds to step S6 to make a decision as to whether or not the deceleration operation is terminated. In this case, it is decided that the deceleration operation has just been canceled if, for instance, the travel pedal 22a has been depressed to an extent to which the pressure detection value Pt is greater than the predetermined value Pt1. If an affirmative decision is made in step S6, the operation proceeds to step S13, whereas the operation proceeds to step S15 if a negative decision is made. In step S15, a decision is made as to whether or not the deceleration control to be executed in step S7 and subsequent steps is to end. This decision is made by comparing the rotation speed command value Nin determined through the previous processing with the target rotation speed Nt (the target rotation speed Nt calculated based upon the pressure detection value Pt) indicated in response to the command issued through the operation of the travel pedal 22a. If Nin≦Nt, it is judged that the deceleration control is to end, to proceed to step S16, but the operation proceeds to step S7 otherwise. Namely, it is judged that the deceleration control is to end at the time point at which the rotation speed command value Nin becomes equal to the target rotation speed Nt indicated in the command issued through the travel pedal 22a (at the time point at which the rotation speed command value Nin becomes equal to the rotation speed indicated in the command issued by the operator) Instep S16, a decision is made as to whether or not the vehicle is traveling, as in step S10, and the operation proceeds to step S13 if an affirmative decision is made, whereas the operation proceeds to step S17 if a negative decision is made. In step S17, the traveling flag is set to 0, before the operation proceeds to step S13.

Next, the processing executed by the servo control unit is explained. First, the rotation speed command value Nin set at the delay control unit 56 and the control rotation speed Nθ detected with the potentiometer 44 are individually read in step S21 in FIG. 7. Then, in step S22, the results of subtracting Nin from Nθ are stored as a rotation speed difference A in memory, and in step S23, a decision is made as to whether or not |A|≧K is true with regard to the rotation speed difference A and a predetermined reference rotation speed difference K. If an affirmative decision is made, the operation proceeds to step S24 to decide whether or not the rotation speed difference A is greater than 0. If A>0, the control rotation speed Nθ is greater than the rotation speed command value Nin, i.e., the control rotation speed is higher than the target rotation speed and, accordingly, a signal constituting a command for a motor reverse rotation is output to the pulse motor 43 in step S25 in order to lower the engine rotation speed. In response, the pulse motor 43 rotates in the reverse direction, thereby lowering the engine rotation speed.

If, on the other hand, A≦0, the control rotation speed Nθ is lower than the rotation speed command value Nin, i.e., the control rotation speed is lower than the target rotation speed and, accordingly, a signal constituting a command for a motor forward rotation is output in step S26 in order to raise the engine rotation speed. In response, the pulse motor 43 rotates forward, thereby raising the engine rotation speed. If a negative decision is made in step S23, the operation proceeds to step S27 to output a motor stop signal and, as a result, the engine rotation speed is sustained at a constant level. Once the processing in one of steps S25 through S27 is executed, the operation returns to the start point.

Next, the operation that characterizes the prime mover control device achieved in the first embodiment is explained.

The brake switch 32 is set to the traveling position and the forward/backward selector switch is set to the forward position or the backward position when the vehicle is to travel. As the fuel lever is set to the idling position and the travel pedal 22a is depressed in this state, the control valve 12 is switched in correspondence to the extent of the pedal operation and the traveling motor 5 is caused to revolve by the pressure oil from the main pump 11.

At this point, the traveling flag and the deceleration flag are respectively set to 1 and 0 and the target rotation speed Nt having been selected at the selection unit 54 is set as the rotation speed command value Nin at the delay control unit 56 (step S14). Thus, with the signal output from the servo control unit 57 to the pulse motor 43, control is implemented to set the engine rotation speed equal to the target rotation speed Nt. In this situation, the engine rotation speed is adjusted in correspondence to the extent to which the travel pedal 22a is operated in conformance to the characteristics stored in memory at the rotation speed calculation unit 51. As a result, desirable acceleration is achieved, an improvement in fuel efficiency is achieved and the level of noise is reduced.

Figure 8:
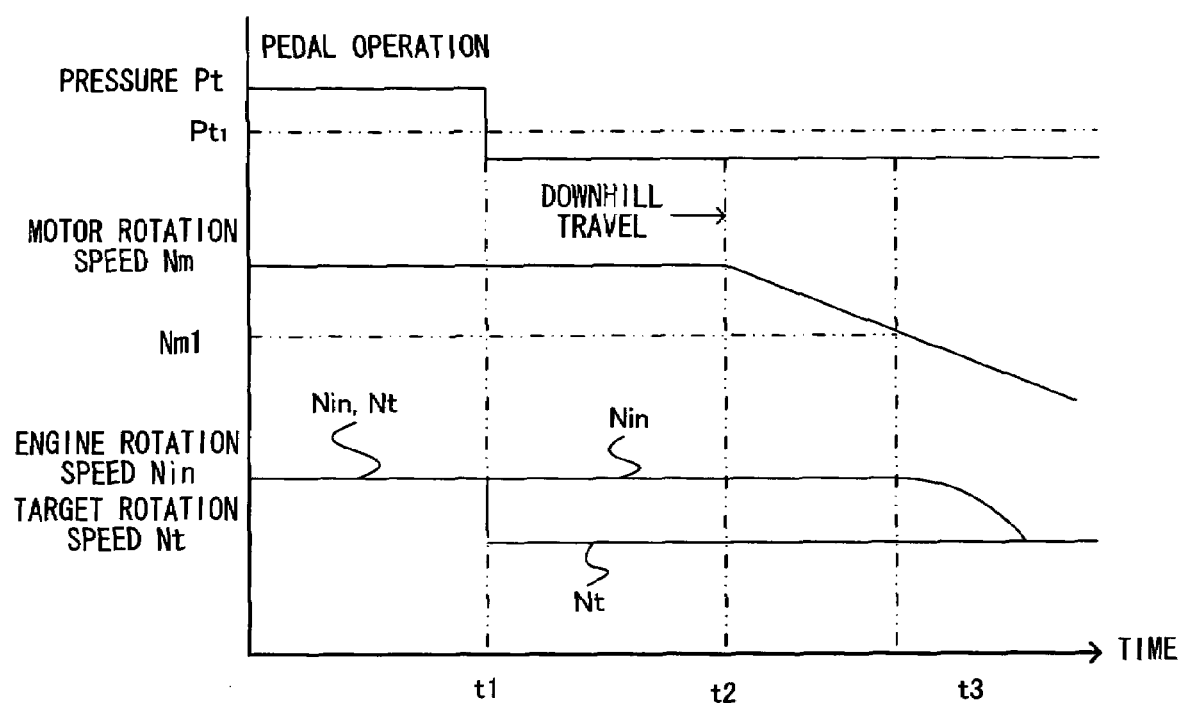
FIG. 8 illustrates the operation of the prime mover control device achieved in the first embodiment.

As the accelerator pedal 22a is released at a time point t1 while the vehicle is traveling downhill, the control valve 12 is switched to the neutral position. Thus, while a hydraulic braking force is applied in the traveling motor 5 against the inertial force of the vehicle body, the inertial force of the vehicle body is significant and for this reason, the motor rotation speed Nm (vehicle speed) does not become lowered quickly, which keeps the motor rotation speed Nm greater than, for instance, the predetermined value Nm1, as shown in FIG. 8. At this time, the traveling pilot pressure Pt becomes equal to or less than the predetermined value Pt1, the traveling flag and the deceleration flag are both set to 1 at the delay control unit 56, and the rotation speed command value Nin is left unchanged from the control rotation speed at the deceleration operation start (step S9). As a result, the engine rotation speed is sustained at a constant level, as shown in FIG. 8, and thus, the quantity of oil output from the pump does not decrease greatly. As a result, with the sufficient quantity of oil taken into the traveling motor 5 from the make-up port 15, cavitation can be prevented.

As the vehicle finishes traveling downhill at a time point t2 and the motor rotation speed Nm becomes equal to or less than the predetermined value Nm1 at a time point t3, the rotation speed command value Nin is gradually decreased (step S8). In response, the engine rotation speed is slowed down, as shown in FIG. 8. Since the motor rotation speed is low, the make-up pressure does not need to be as high as that required for downhill traveling, and cavitation can be prevented effectively enough by slowing down the engine rotation speed. The engine rotation speed is continuously slowed down until the rotation speed command value Nin becomes equal to or less than the target rotation speed Nt. Once the rotation speed command value Nin is lowered to the target rotation speed Nt, the engine rotation speed is set to the value Nmax corresponding to the extent to which the travel pedal 22a is operated (step S15->step S13).

If, on the other hand, the travel pedal 22a is operated and the traveling pilot pressure Pt increases to a level greater than the predetermined value Pt1 while the vehicle is decelerating, the deceleration operation is terminated and the deceleration flag is set to 0 (step S6->step S13). In response, the process of slowing down the engine rotation speed is stopped, and the engine rotation speed is immediately reset to the value Nmax corresponding to the extent to which the travel pedal 22a is operated (step S14).

To engage the vehicle in work, the brake switch 32 is set to the work position and the forward/backward selector switch is set to the neutral position. As the operating lever 28a is operated in this state, the control valve 27 is switched in correspondence to the extent to which the operating lever is operated, thereby driving the boom cylinder 4d.

At this time, based upon the arithmetic operation executed at the control circuit 30, the maximum value selection unit 55 makes a selection from the target rotation speed Nd and the target rotation speed Nx corresponding to the extent of the fuel lever operation for the larger value. Accordingly, by setting in advance the target rotation speed Nx to a value suited to the particular nature of the work to be undertaken via the fuel lever, the engine rotation speed is not allowed to increase suddenly during the work to improve the operability and fuel efficiency. Since the slope of the characteristics stored in the rotation speed calculation unit 53 is small, the target rotation speed Nx can be set with ease.

By adopting the first embodiment in which the engine rotation speed is slowed down in correspondence to the rotation of the traveling motor 5 at the start of a deceleration operation, cavitation can be prevented effectively. Namely, the engine rotation speed is sustained at a specific level to compensate for an insufficient make-up pressure when the motor rotation speed Nm is greater than the predetermined value Nm1, whereas the engine rotation speed is slowed down when the motor rotation speed is equal to or less than the predetermined value Nm1 since a sufficient level of make-up pressure is assured. As a result, even when the vehicle is traveling downhill, a sufficient make-up pressure is assured and thus, the oil is supplied with a sufficiently high make-up flow rate to reliably prevent the occurrence of cavitation. When the vehicle is not being decelerating, the engine rotation speed is adjusted in correspondence to the extent to which the travel pedal 22a is operated to achieve desirable acceleration. If the travel pedal 22a is operated while gradually reducing the engine rotation speed, the process of slowing down the engine rotation speed or speed reduction is immediately terminated and, as a result, good acceleration is achieved even when the speed reduction process has been in progress.

It is to be noted that the embodiment can be adopted equally effectively when the vehicle is not traveling downhill but a sufficient level of make-up pressure cannot be achieved against the inertial force of the vehicle body.

Second Embodiment

Figure 9:
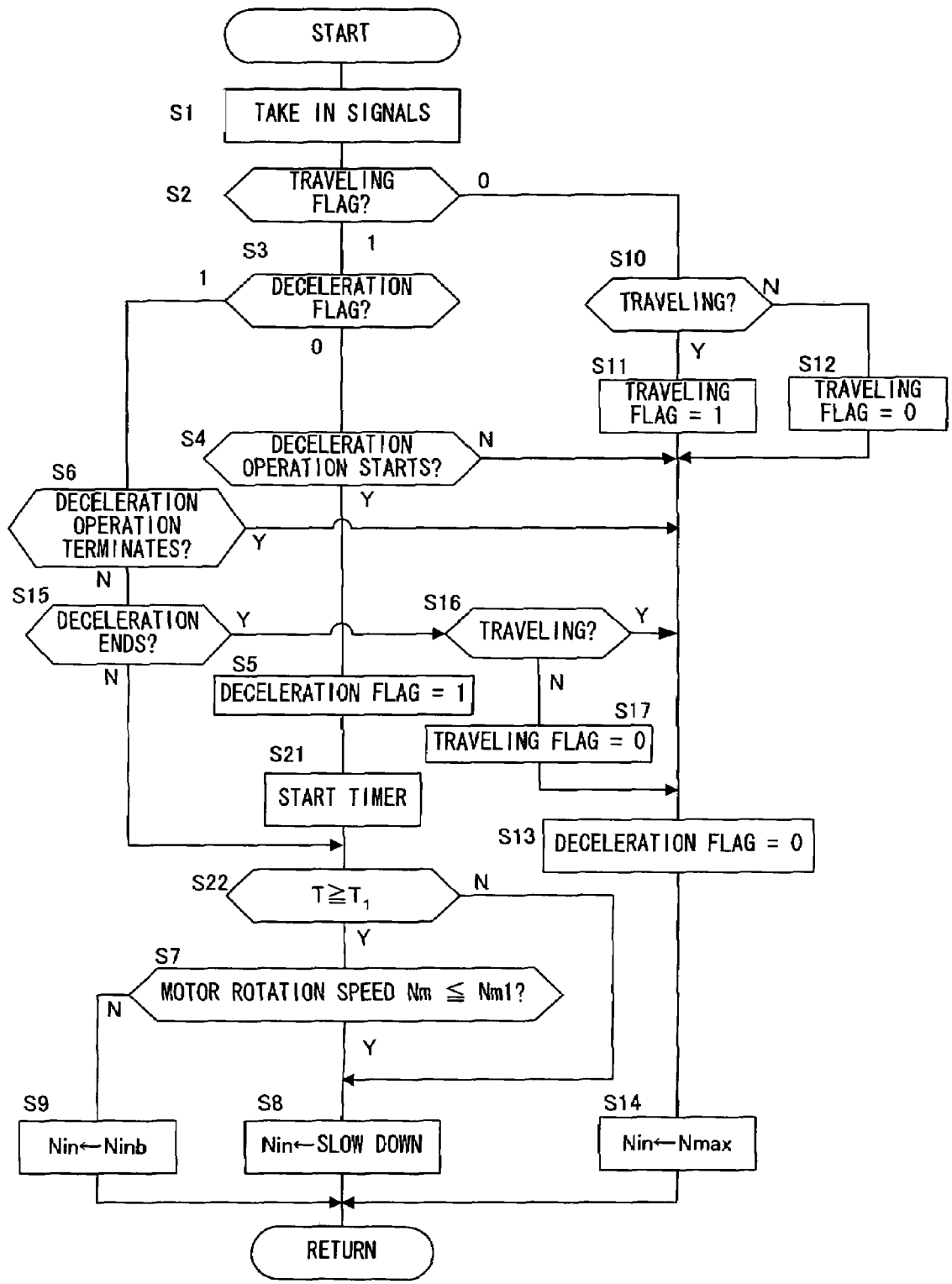
FIG. 9 presents a flowchart of the control procedure in the delay control unit achieved in a second embodiment.
Figure 10:
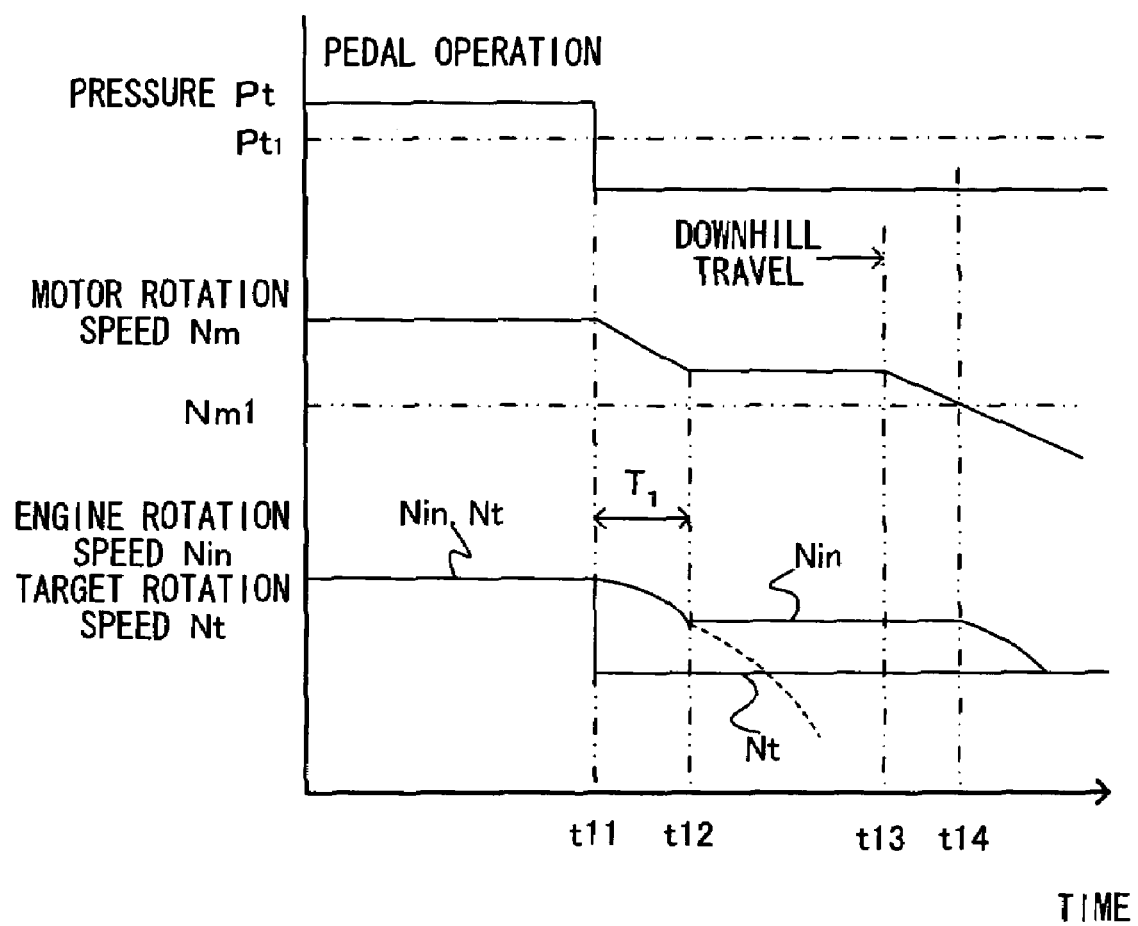
FIG. 10 illustrates the operation of the prime mover control device achieved in the second embodiment.

In reference to FIGS. 9 and 10, the second embodiment of the prime mover control device according to the present invention is explained. The following explanation focuses on the differences from the first embodiment.

The second embodiment differs from the first embodiment in the processing executed by the delay control unit 56. Namely, the engine rotation speed is slowed down if the motor rotation speed Nm is equal to or less than the predetermined value Nm1 during the deceleration operation in the first embodiment. Instead, the engine rotation speed is slowed down for the deceleration operation and subsequently, if the motor rotation speed Nm is judged to be greater than the predetermined value Nm1, the speed reduction operation is disabled in the second embodiment.

FIG. 9 presents a flowchart of the processing procedure at the delay control unit 56 of the prime mover control device achieved in the second embodiment. It is to be noted that the same step numbers are assigned to steps in which processing identical to that in FIG. 6 is executed and the following explanation focuses on the differences from the processing in FIG. 6. As shown in FIG. 9, after it is decided in step S4 that a deceleration operation is to start, the deceleration flag is set to 1 in step S5 and a timer is started in step S21. Subsequently, a decision is made in step S22 as to whether or not the time count by the timer now indicates a predetermined length of time T1. The operation proceeds to step S7 if an affirmative decision is made, but the operation skips step S7 and proceeds to step S8 if a negative decision is made.

The operation executed in the second embodiment is now explained in reference to FIG. 10. After the deceleration operation starts at a time point t11, the rotation speed command value Nin is gradually decreased until the predetermined length of time T1 elapses (step S22->step S8). As a result, the engine rotation speed slows down, as illustrated in the figure between the time point t11 and a time point t12. As the engine rotation speed slows down, the make-up pressure, too, becomes lowered, which increases the braking force applied to the vehicle. Thus, the motor rotation speed Nm gradually becomes lower, as shown in the figure. It is to be noted that the predetermined length of time T1 is set to a value at which at least the occurrence of cavitation is prevented.

After the predetermined length of time T1 elapses, if the motor rotation speed Nm is greater than the predetermined value Nm1 at the time point t12, the engine rotation speed stops slowing down and the engine rotation speed is sustained at the current value, as indicated by the solid line in FIG. 10 (step S9). Then, as the vehicle finishes its downhill travel at a time point t13 and the motor rotation speed Nm becomes equal to or less than the predetermined value Nm1 at a time point t14 the process of slowing down the engine rotation speed is started (step S8). If, on the other hand, the motor rotation speed Nm is equal to or less than the predetermined value Nm1 at the time point t12 following the predetermined length of time T1, the engine rotation speed continues to slow down, as indicated by the dotted line in FIG. 10.

By adopting the second embodiment, in which the engine rotation speed is slowed down over the predetermined length of time T1 during the deceleration operation regardless of the motor rotation speed, the engine rotation speed can be reduced quickly to improve the fuel efficiency while preventing the occurrence of cavitation. At the start of the deceleration operation and when the motor rotation speed becomes lowered to a level equal to or less than the predetermined value Nm1, identical processing (step S8) is executed to slow down the engine rotation speed. Thus, the speed reduction characteristics (the characteristics manifesting between the time points t11 and t12) at the start of the deceleration operation and the speed reduction characteristics manifesting (after the time point t12 or after the time point t14) when the motor rotation speed Nm is equal to or less than the predetermined value Nm1 are identical to each other. Thus, if the engine rotation speed Nm is equal to or less than the predetermined value Nm1 after the predetermined length of time T1 elapses, the engine rotation speed can be smoothly slowed down as indicated by the dotted line in FIG. 10.

It is to be noted that while the engine rotation speed is slowed down over the predetermined length of time T1 at the start of the deceleration operation in the second embodiment, the engine rotation speed may instead be slowed down so that the engine rotation speed decreases by a predetermined extent. Namely, instead of executing the processing in steps S21 and S22, a decision may be made as to whether or not the engine rotation speed has become lower by the predetermined extent and then the operation than may proceed to step S7 if an affirmative decision is made, whereas the engine rotation speed may be slowed down in step S8 if a negative decision is made. In addition, the speed reduction characteristics manifesting (between the time points t11 and t12) at the start of the deceleration operation and the speed reduction characteristics manifesting (after the time point t12 or the time point t14) when the motor rotation speed Nm is equal to or less than the predetermined value Nm1 may be different from each other.

It is to be noted that while the extent of the operation of the travel pedal 22a is detected with the pressure sensor 31 in the explanation provided above, a potentiometer, for instance, may be directly mounted at the travel pedal 22a to detect the extent of its operation instead. In addition to the pressure sensor 31 that detects the pressure, a timer that measures the length of time over which the travel pedal 22a is held down, i.e., the length of time over which pressure is detected by the pressure sensor 31, may be provided as a means for traveling state detection, and in such a case, the vehicle may be judged to be in a traveling state if the travel pedal 22a remains held down over a predetermined length of time or longer. This structure achieves desirable operability without engaging the speed reduction control for slowing down when the vehicle repeats frequent start/stop operations, e.g., when the vehicle is moved to set it at the correct work position.

The start of the decelerating operation may be detected when the travel pedal 22a is not being operated, or the deceleration operation may be detected when the extent of pedal operation has decreased by at least a predetermined degree. In addition, the deceleration operation may be detected by comparing the previous operating pressure (detected with the pressure sensor 31) with the current operating pressure and, in such a case, a deceleration may be judged to be occurring if the current operating pressure is smaller than the previous operating pressure.

While the rotation speed of the traveling motor 5 is detected with the rotation speed sensor 35, the rotation speed of the traveling motor 5 may instead be indirectly detected by using a vehicle speed sensor. The engine rotation speed may be adjusted in correspondence to the rotation speed of the traveling motor 5 during the deceleration operation. In other words, the engine rotation speed may be set higher as the rotation speed of the traveling motor 5 increases.

INDUSTRIAL APPLICABILITY

While an explanation is given above on an example in which a wheeled hydraulic excavator represents an example of a construction machine in which the present invention may be adopted, the present invention may also be adopted in other types of construction machines such as non-wheel construction machines.

The invention claimed is:

1. A prime mover control device of a construction machine that includes:
a hydraulic pump driven by a prime mover;
a hydraulic traveling motor driven with pressure oil output from the hydraulic pump; and
a control valve that controls a flow of the pressure oil from the hydraulic pump to the hydraulic motor in response to an operation of an operating member, comprising:
a deceleration detection device that detects a deceleration operation at the operating member;
a rotation speed detection device that detects a rotation speed of the hydraulic motor; and
a prime mover rotation speed control device that executes speed reduction control of the rotation speed of the prime mover based upon detection results provided by the rotation speed detection device if the deceleration operation is detected by the deceleration detection device and that controls the rotation speed of the prime mover in correspondence to an operation of the operating member which is detected to be other than the deceleration operation.

2. A prime mover control device of a construction machine according to claim 1, wherein:
when the deceleration operation is detected by the deceleration detection device, the rotation speed of the prime mover is sustained at a constant level if the motor rotation speed detected by the rotation speed detection device is greater than a predetermined value and the rotation speed of the prime mover is gradually reduced if the detected motor rotation speed is equal to or less than the predetermined value under the speed reduction control executed by the prime mover rotation speed control device.

3. A prime mover control device of a construction machine according to claim 1, wherein:
when the deceleration operation is detected by the deceleration detection device, the rotation speed of the prime mover is gradually reduced over a predetermined length of time and then following the predetermined length of time, the rotation speed of the prime mover is sustained at a constant level if the motor rotation speed detected by the rotation speed detection device is greater than a predetermined value but the rotation speed of the prime mover is gradually reduced if the detected motor rotation speed is equal to or less than the predetermined value, under the speed reduction control executed by the prime mover rotation speed control device.

4. A prime mover control device of a construction machine according to claim 1, wherein:
when the deceleration operation is detected by the deceleration detection device, the rotation speed of the prime mover is gradually reduced by a predetermined degree, and after the rotation speed of the prime mover is reduced by the predetermined degree, the rotation speed of the prime mover is sustained at a constant level if the motor rotation speed detected by the rotation speed detection device is greater than a predetermined value but the rotation speed of the prime mover is gradually reduced if the detected motor rotation speed is equal to or less than the predetermined value, under the speed reduction control executed by the prime mover rotation speed control device.

5. A wheeled hydraulic excavator, comprising:
a hydraulic pump driven by a prime mover;
a hydraulic traveling motor driven with pressure oil output from the hydraulic pump;
a control valve that controls a flow of the pressure oil from the hydraulic pump to the hydraulic motor in response to an operation of an operating member; and
a prime mover control device according claim 1.

* * * * *